United States Patent [19]
Johnson, Sr.

[11] 4,453,875
[45] Jun. 12, 1984

[54] DISPLACEABLE LINER FOR UNLOADING WHEEL SUPPORTED RECEPTACLES

[76] Inventor: Theodore C. Johnson, Sr., 14917 Hillbrook Cir., Novelty, Ohio 44072

[21] Appl. No.: 397,526

[22] Filed: Jul. 12, 1982

[51] Int. Cl.³ .............................................. B65G 67/24
[52] U.S. Cl. ..................... 414/304; 414/393; 220/400; 220/403; 220/461; 206/524.2; 206/524.3; 221/260; 296/39 R; 105/355; 105/423
[58] Field of Search ........................ 414/304, 393, 539; 298/1 B; 105/422, 423, 355, 375, 378; 296/39 R, 100; 221/260; 220/400, 403, 461; 206/524.1, 524.2, 524.3, 524.6, 524.9

[56] References Cited

U.S. PATENT DOCUMENTS

| | | | |
|---|---|---|---|
| 134,330 | 12/1872 | Threlfall | 414/393 |
| 279,939 | 6/1883 | Griswold | 414/395 |
| 397,551 | 2/1889 | Hunter | 414/393 |
| 510,937 | 12/1893 | Schrag | 414/395 |
| 529,583 | 11/1894 | Beatty | 414/393 |
| 818,257 | 4/1906 | Kennedy | 296/39 R |
| 1,088,100 | 2/1914 | Saunders et al. | 414/393 |
| 1,144,559 | 6/1915 | Mendelson et al. | 221/260 |
| 1,259,320 | 3/1918 | Tyler | 296/39 R |
| 1,329,392 | 2/1920 | Ford | 414/395 |
| 2,573,584 | 10/1951 | Le Tourneau | 414/393 |
| 2,662,650 | 12/1953 | Russell | 414/393 |
| 2,663,439 | 12/1953 | Phelps | 298/1 B |
| 2,936,913 | 5/1960 | Watt et al. | 414/393 |
| 2,990,974 | 7/1961 | Brown | 221/260 |
| 3,484,850 | 12/1969 | Rodrigue | 414/393 |
| 3,519,164 | 7/1970 | Lehto | 220/453 |
| 3,549,030 | 12/1970 | Coughran et al. | 414/539 X |

FOREIGN PATENT DOCUMENTS

| | | |
|---|---|---|
| 516963 | 1/1931 | Fed. Rep. of Germany . |
| 52172 | 6/1934 | Norway . |
| 870530 | 6/1961 | United Kingdom . |

Primary Examiner—Robert J. Spar
Assistant Examiner—Ken Muncy
Attorney, Agent, or Firm—Body, Vickers & Daniels

[57] ABSTRACT

A wheel supported open top receptacle such as a railway car is provided with a liner arrangement comprising a plurality of belt members arranged between the end walls of the car with the sides of adjacent ones of the belts overlapped in the direction between the end walls, and with each belt overlying the side walls and bottom wall of the car. One end of each belt member is attached to the upper end of the corresponding one of the side walls and, by upward displacement of the other end, each belt is adapted to be displaced upwardly relative to the car. Material in the car is progressively unloaded laterally outwardly of the car by sequential displacement of the belts in accordance with the pattern of overlap.

10 Claims, 4 Drawing Figures

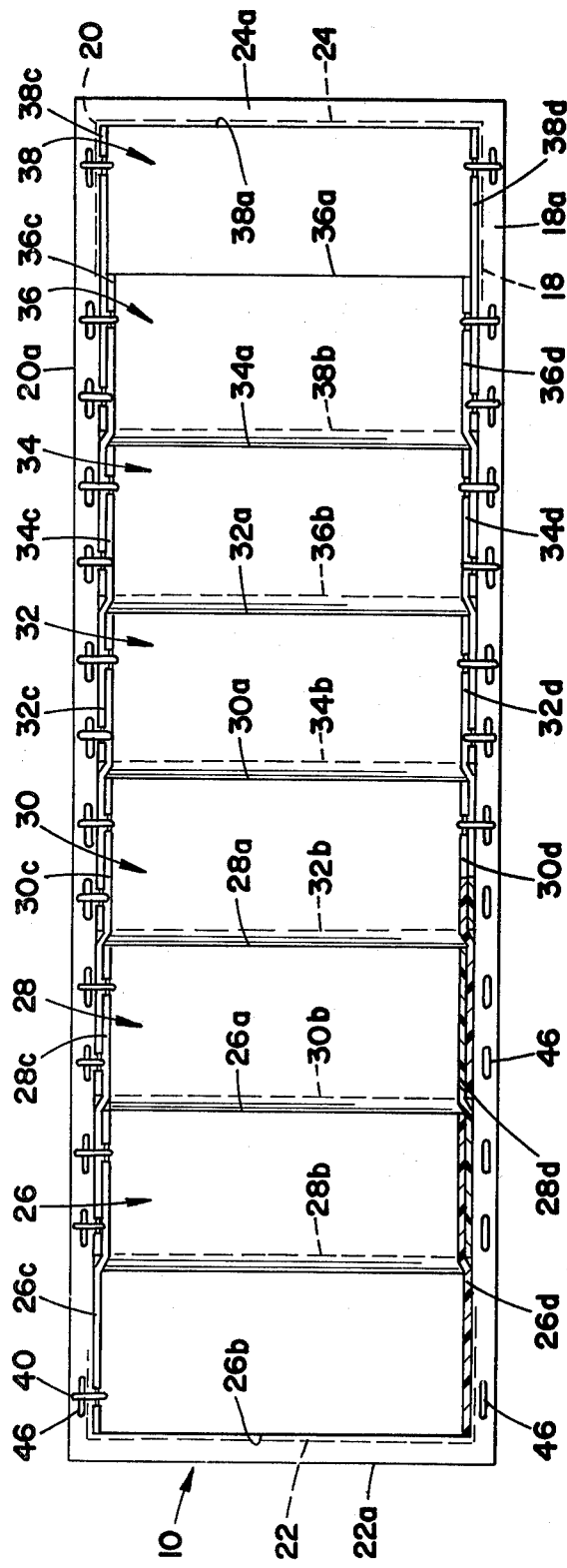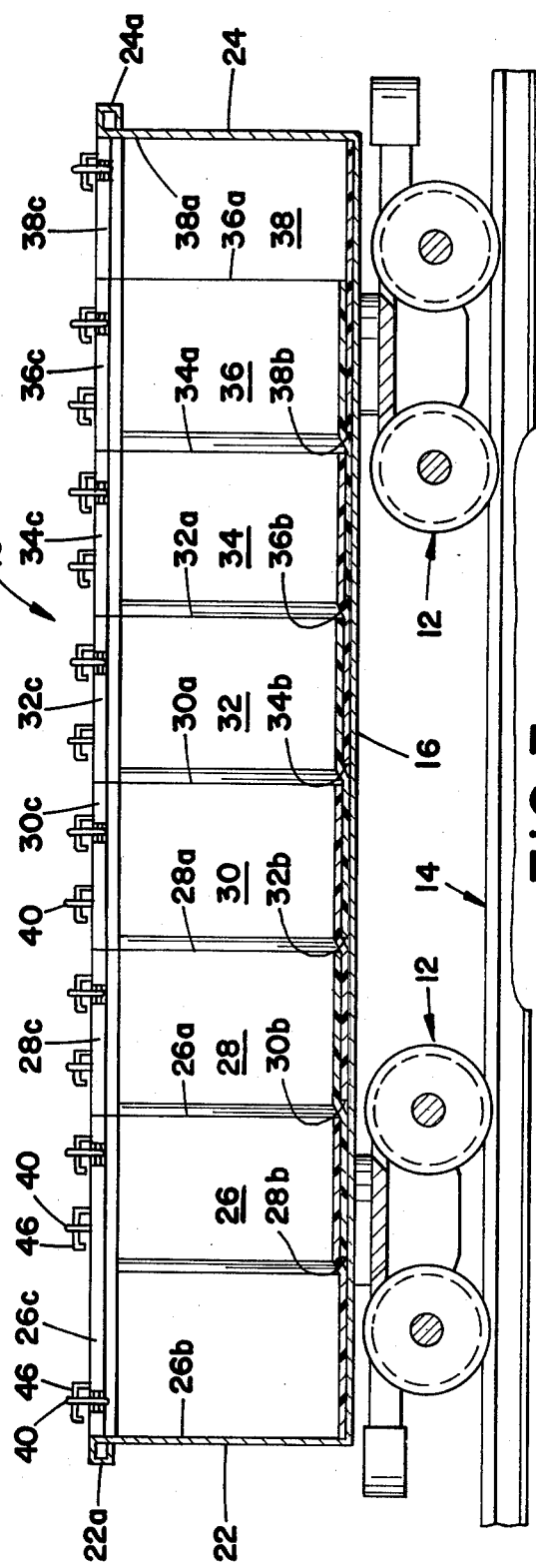

DISPLACEABLE LINER FOR UNLOADING WHEEL SUPPORTED RECEPTACLES

BACKGROUND OF THE INVENTION

This invention relates to the art of material handling and, more particularly, to a displaceable liner arrangement for unloading an open top receptacle.

The present invention finds particular utility in connection with the unloading of an open top railway car and, accordingly, is disclosed and described in detail hereinafter in connection with such use. However, it will be appreciated that the invention is applicable to the unloading of wheel supported receptacles other than railway cars, and to the unloading of receptacles other than wheel supported receptacles.

The lateral unloading of open top wheel supported receptacles through the use of a liner in the receptacle having one end of the liner fixed to a side wall of the receptacle and the other end displaceable upwardly of the receptacle to achieve unloading is known as shown, for example, in U.S. Pat. Nos. 2,573,584 to Le Tourneau and 3,484,850 to Rodrigue. In such prior art arrangements, the liner is a unitary component, whereby the entire load within the receptacle is elevated and displaced therefrom at the same time during the unloading operation. Such simultaneous displacement of the entire contents requires both the provision of a liner having sufficient structural integrity to support the load and the use of structurally complex and/or large and expensive heavy duty equipment to achieve displacement of the liner and the load thereon during an unloading operation. Accordingly, such liner components and liner arrangements are undesirably expensive to construct, and the equipment or mechanisms for displacing the liners during an unloading operation are undesirably large, expensive and/or complex in structure.

It has also been proposed heretofore, as shown in U.S. Pat. No. 2,662,650 to Russell, to sequentially unload portions of an open top trailer receptacle in the direction rearwardly thereof through the use of a plurality of belts disposed in the receptacle lengthwise thereof and in overlapping relationship so as to divide the receptacle into compartments. The receptacle is unloaded by sequentially drawing the belts upwardly and rearwardly of the receptacle. While this belt arrangement overcomes the requirement for a single belt or liner component to bear the entire weight of the contents of a receptacle during an unloading operation, there are several disadvantages attendant to the structural arrangement of the belts and to the manipulation thereof to unload a receptacle. In this respect, for example, the succeeding portions of material unloaded from the receptacle are discharged at the same point at the rear of the receptacle and across the width thereof, whereby each belt must be removed or care taken otherwise to prevent the succeeding portions of material from being displaced onto or against the preceding belts. Further, regardless of whether the Russell belt arrangement is provided to empty a receptacle longitudinally or laterally thereof, efficient use is not made of the belt material, thus rendering the arrangement unnecessarily expensive. More importantly, the Russell belt arrangement requires the pre-forming of bins in the receptacle for the respective portions of the material loaded therein. Further, sequential filling of such bins from the rear end of the receptacle is necessary to prevent distortion of the upwardly extending portions of the belt material which would occur in the absence of such sequential loading. Such distortion would change the bin configuration and provide for unequal amounts of material in the bins and, thus, unequal load distribution on the belts during unloading displacement thereof. Such pre-forming of the bins and sequential filling thereof is time consuming and thus expensive and inefficient in connection with use of the unloading arrangement. Further disadvantage results from the fact that opposite sides of the belt material forming the bin particles are subjected to undesirable wear and potential damage by the imposition of forces and stresses in opposite directions thereagainst by the material in the adjacent bins.

SUMMARY OF THE INVENTION

In accordance with the present invention, improved displaceable liner arrangements are provided for unloading an open top receptacle and which arrangements retain the desirable feature of enabling a sequential unloading of material and thus distribution of the total load thereof to reduce the strength and structural integrity requirements with respect to the liner components, while avoiding the disadvantages pointed out hereinabove, and others, of previous liner arrangements. More particularly in this respect, liner arrangements according to the present invention minimize the amount of liner material required, and enable the desired sequential unloading to be achieved without the preliminary requirements of pre-forming bins or compartments and sequential loading of material into the latter. Moreover, liner arrangements according to the present invention enable the material sequentially unloaded to be discharged laterally outwardly at different locations along the length of a wall of the receptacle. Still further, liner arrangements according to the present invention enable the sequential unloading to be selective with respect to locations laterally outwardly of opposite walls of the receptacle, thus advantageously providing versatility with respect both to the amount of material unloaded to a given area and the location of the area relative to the receptacle. All of these advantages lend to providing lining arrangements which are economical to produce and efficient and simple to use and manipulate in connection with receptacle loading and unloading operations.

The foregoing advantages are achieved in accordance with the present invention by a liner arrangement comprised of a plurality of belt members each having opposite ends and opposite sides and which belt members are arranged side-by-side with the adjacent sides thereof in overlapping relationship and with the opposite ends thereof disposed at the upper ends of an opposed pair of the receptacle walls. The belts extend downwardly along one of the latter pair of walls, thence along the bottom wall of the receptacle and upwardly along the other of the opposed pair of walls. Unloading is achieved by attaching one of the opposite ends of each belt member to the upper end of the corresponding one of a pair of walls, and sequentially elevating the other of the opposite ends in accordance with the pattern of overlap so as to elevate each belt and displace a corresponding portion of the contents of the receptacle outwardly of the receptacle wall to which the one end of the belt member is secured. It will be appreciated that the side-by-side relationship of the belt members provides for the portion of the material in the receptable unloaded by each belt member to be deposited outwardly adjacent the receptacle wall at a location therealong different from that of each of the other belt members. In connection with a receptacle such as that provided by an open top railway car in which the side walls are longer than the end walls, the opposed pair of walls referred to hereinabove can be either such side walls or end walls, whereby the liner arrangement is adapted to be associated with such a receptacle to achieve end or side unloading thereof. Furthermore, attachment of the belt ends to the upper end of a receptacle wall is preferably by a detachable connection and selectively with respect to the pair of opposed walls. This advantageously enables all of the unloading to be achieved relative to a selected one of the opposed walls by connecting corresponding ends of the belt members to a common one of the walls, or for the unloading to be relative to both such walls by connecting the ends of certain of the belts to one of the walls and the ends of others of the belt to the other wall.

It is accordingly an outstanding object of the present invention to provide improved lining arrangements for sequentially unloading the contents of an open top receptacle having a bottom wall and opposed pairs of walls extending upwardly therefrom.

A further object is the provision of liner arrangements of the foregoing character which provide improved versatility with respect to the amount and direction of unloading of material relative to the walls of the receptacle.

Yet a further object is the provision of liner arrangements of the foregoing character which enable sequential unloading of the receptacle outwardly of any one of the upwardly extending receptacle walls.

Still a further object is the provision of lining arrangements of the foregoing character which enable sequential unloading selectively relative to either one or both of a pair of opposed receptacle walls.

Yet another object is the provision of liner arrangements of the foregoing character which are economical to produce, which are simple and efficient to use in connection with loading and unloading a receptacle, which minimize requirements with respect to the amount of lining material required with respect to a given size receptacle, and which minimize wear and potential damage to the liner material during loading and unloading operations.

BRIEF DESCRIPTION OF THE DRAWINGS

The foregoing objects, and others, will in part be obvious and in part pointed out more fully hereinafter in connection with the written description of an embodiment of the invention illustrated in the accompanying drawings in which:

FIG. 2 is a top view of the car and lining arrangement shown in FIG. 1;

FIG. 3 is a cross-sectional elevation view of the car and liner arrangement taken along line 3—3 in FIG. 1; and, FIG. 4 is a detailed perspective view illustrating an arrangement for selectively and releaseably connecting the opposite ends of the belt members with the top ends of the railway car walls.

DESCRIPTION OF A PREFERRED EMBODIMENT

Figure 1:
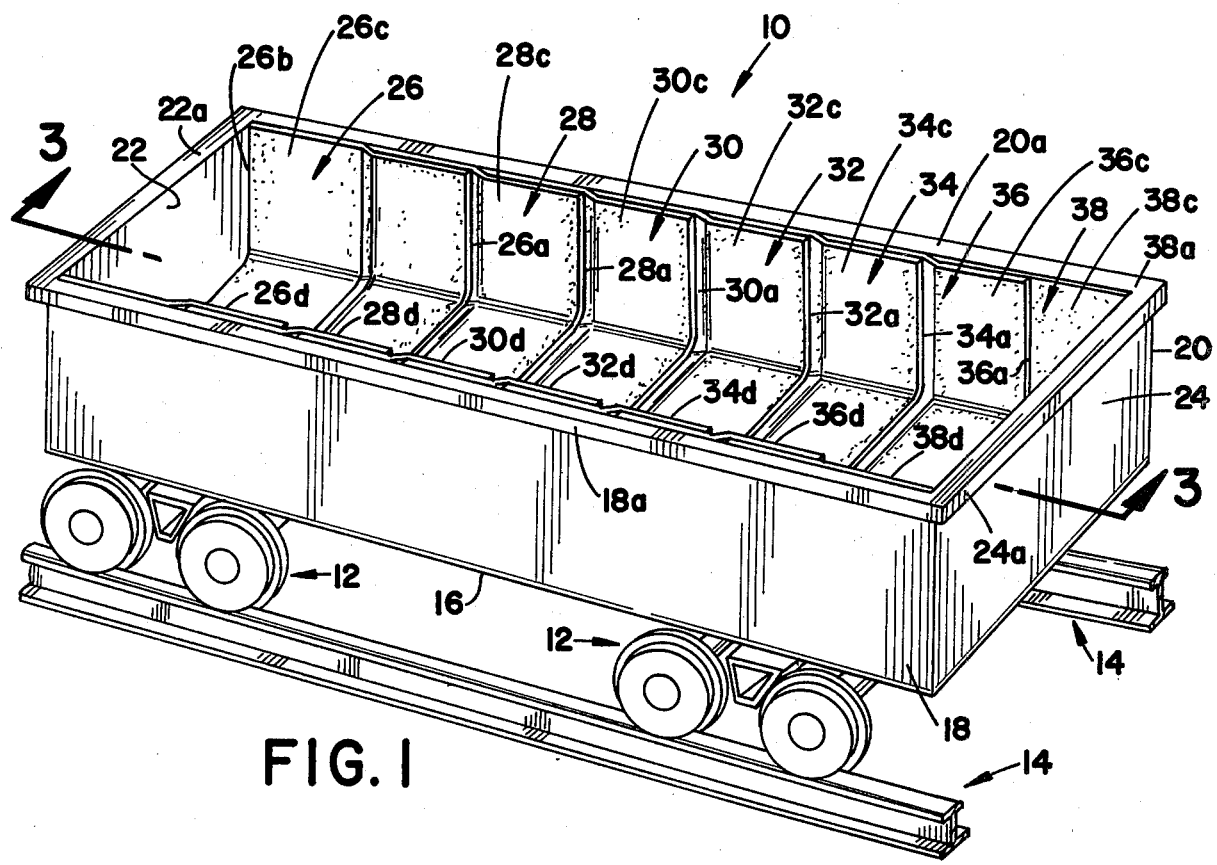
FIG. 1 is a perspective view showing a displaceable liner arrangement according to the present invention in association with an open top railway car.

Referring now in greater detail to the drawings wherein the showings are for the purpose of illustrating a preferred embodiment of the invention only, and not for the purpose of limiting the invention, a displaceable liner arrangement according to the present invention is illustrated in association with an open top railway car 10 having wheels 12 by which the car is supported for displacement along railway tracks 14. Car 10 includes a bottom wall 16, spaced apart side walls 18 and 20 extending upwardly from and along opposite sides of bottom wall 16, and spaced apart end walls 22 and 24 extending upwardly from bottom wall 16 and between side walls 18 and 20 at the opposite ends of the bottom wall. Walls 18, 20, 22 and 24 have upper ends providing the open top for the car and, in the embodiment illustrated, the upper end of each wall includes a corresponding bulb rail portion extending along the length thereof and designated 18a, 20a, 22a and 24a, respectively.

A displaceable liner arrangement for car 10 is provided in accordance with the present invention by a plurality of adjacent belt members 26, 28, 30, 32, 34, 36 and 38 between end walls 22 and 24 and overlying side walls 18 and 20 and bottom wall 16 of the car. The several belt members can be provided by any suitable flexible material and, preferably, are of closed construction such as would be provided by fabric reinforced rubber sheet material or heavy industrial belting. The belt members have corresponding first and second sides extending in the direction between side walls 18 and 20, which first and second sides for each belt is designated by small letters a and b, respectively, in association with the corresponding belt number. Further, the belt members have opposite ends transverse to the sides thereof and each disposed adjacent the upper end of the corresponding one of the side walls 18 and 20 of the car. In the drawings, the opposite ends of the belts are designated by small letters c and d in conjunction with the belt numbers. Each of the belt members has a width in the direction between the opposite sides thereof which is less than the distance between end walls 22 and 24 of the car and, in the embodiment disclosed, the belts are arranged with the first side of each belt overlapping the second side of the next adjacent belt in the direction from end wall 22 toward end wall 24.

Unloading of car 10 with the liner arrangement described hereinabove is achieved by connecting one of the opposite ends of each of the belt members to the upper end of the corresponding side wall of the car and, in the appropriate sequence, displacing the free end of each belt member upwardly relative to the other of the side walls so as to displace the belt member upwardly from the receptacle for the material thereon to be displaced to a location laterally outwardly of the one side wall of the car. Any suitable arrangement can be employed for connecting one of the opposite ends of each belt member to the upper end of a car side wall and for enabling upward displacement of the other end of the belt during an unloading operation and, preferably, each of the opposite ends of the belt members and the upper ends of the side walls of the car are provided with arrangements enabling selectively with respect to such connection of one end and displacement of the other end of the belt members. While not shown in FIG. 1, for purposes of clarity, it will be appreciated that the following description of the arrangement illustrated in FIGS. 2-4 is applicable to FIG. 1 and is exemplary of a suitable arrangement for the foregoing purpose.

Figure 4:
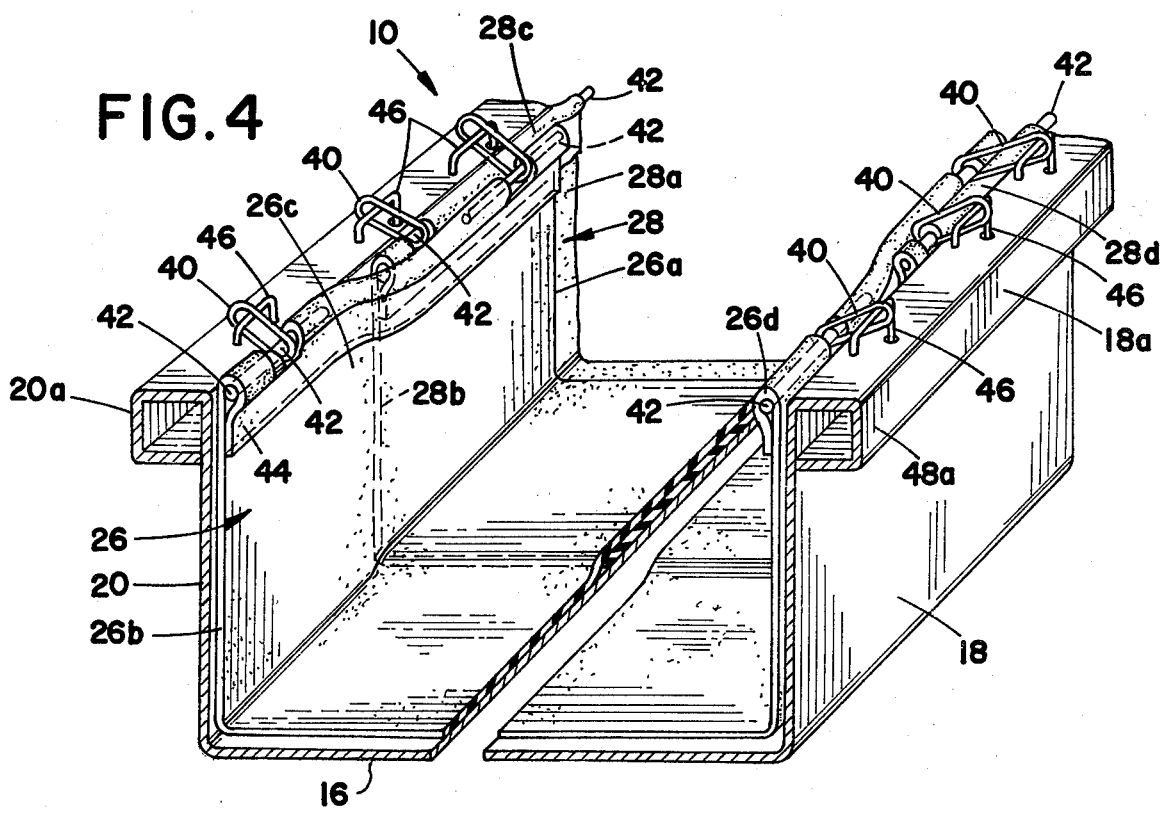

With reference to FIGS. 2-4, each of the opposite ends of the belt members is provided with a closed steel ring or loop component 40 adjacent each of the opposite sides of the belt and suitably connected thereto, such as through the use of a corresponding steel bar or rod 42 embedded in a seam at the end of the belt provided by folding the belt material back upon itself and securely fastening the material such as by stitching 44. The upper ends of side walls 18 and 20 of the car are provided with corresponding laterally open steel hook members 46 rigidly secured to the upper ends of the side walls such as by welding to the upper side of the corresponding bulb rail. As will be appreciated from FIG. 4, loops 40 can be selectively engaged or disengaged with the corresponding hooks 46. Thus, if it is desired for example to displace the contents on belt 26 laterally outward adjacent side wall 18 of car 10, loops 40 on end 26d of belt 26 would be interengaged with the corresponding hooks 46 on bulb rail 18a, and loops 40 on end 26c of the belt would be disengaged from the corresponding hooks 46, thus enabling elevation of the latter end of the belt and discharge of the material thereon. Such elevation of the belt end can be achieved through the use of a crane or the like and the attachment of cables thereof to loops 40 on belt end 26c. Once the contents overlying belt 26 have been unloaded as described above, belt member 26 can either be returned to its lining position within the car, or it can be displaced to a position laterally outside side wall 18 so as to hang downwardly thereof. If belt member 26 is returned to its lining position within the car, then the unloading procedure with respect to material on belt member 28 is achieved by interconnecting loop members 40 on end 28d thereof with the corresponding hooks 46 on bulb rail 18a and then simultaneously elevating ends 26c and 28c of belts 26 and 28 such as through the use of an overhead crane, whereby the material on belt 28 is displaced laterally outwardly of side wall 18 and longitudinally adjacent the material previously unloaded by belt 26. If belt 26 is displaced to hang down over wall 18, as mentioned above, then belt end 28d is connected to wall 18 as described, and end 28c is displaced upwardly by itself to achieve unloading of the contents thereon.

Of considerable advantage in connection with the arrangement shown in FIG. 4 is the fact that loops 40 serve the dual purpose of selectively connecting one belt end to a car wall and providing components by which the other belt end and thus the belt member can be elevated to achieve an unloading operation. It will be appreciated from FIG. 4 and the foregoing description that rings 40 and hooks 46 further enable such unloading of car 10 to be achieved selectively with respect to displacing the material in the car laterally outwardly adjacent either side wall 18 or side wall 20 thereof. Furthermore, loops 40 and hooks 46 enable such selectively in unloading to be achieved alternately with respect to sides 18 and 20. More particularly in this respect, if belt 26 is displaced to overlie the outer side of wall 18 after an unloading displacement thereby as described above, end 26d of the belt is positioned laterally outwardly of end 28d of belt 28. Thus, loops 40 on end 28c of belt 28 can be interengaged with hooks 46 on bulb rail 20a, and end 28d of belt 28 can be elevated in the manner described above with respect to end 26c of belt 26, whereby the contents overlying belt 28 are displaced laterally outwardly adjacent side wall 20.

In light of the foregoing description of unloading displacements of belt members 26 and 28, it will be appreciated from FIGS. 1-3 that the overlapping belt arrangement in the embodiment illustrated provides for car 10 to be sequentially unloaded in the direction from end wall 22 toward end wall 24 thereof by the sequential unloading displacement of the several belts in the latter direction. It will be further appreciated that, depending on the material loaded in car 10, two or more of the adjacent belts, such as belts 26 and 28 for example, could be simultaneously displaced to achieve the simultaneous unloading of the material thereon by elevating corresponding ends of the belt members together as described hereinabove. Such unloading procedure might be employed where long articles such as railway ties disposed lengthwise in car 10 would overlie both belts 26 and 28.

The number of belt members and the width thereof in the direction between end walls 22 and 24 can vary depending on a number of factors including the length of the railway car and/or the nature of the material to be carried in and unloaded therefrom. The extent of overlap between the sides of adjacent belts can likewise vary depending, for example, on the nature of the material to be carried and unloaded. In this respect, for example, in connection with the carrying and unloading of large granular material such as rock and stone, an overlap equal to about one-half the belt width may be desirable so that any material displaced laterally toward the second end of the next adjacent belt during unloading displacement of one belt would remain on the next adjacent belt as opposed to spilling onto the bottom wall of the car.

While emphasis has been placed herein on the belt member structure and the arrangement of adjacent belt members in the embodiment illustrated, it will be appreciated that many changes in the belt members and in the arrangement thereof relative to one another and to the receptacle with which they are associated can be made without departing from the principle of the present invention. In this respect, for example, it will be appreciated that the belt members can be arranged for the opposite sides thereof to extend in the direction between the end walls of an elongate open top receptacle as opposed to extending between the side walls of the receptacle. Further, it will not only be appreciated that the direction of overlap of the belts can be reversed from that shown in the drawings, but that other patterns of overlap can be employed to provide for the sequence of belt displacement during an unloading operation to be other than from one end of the receptacle to the other. In this respect, for example, the pattern of overlap can provide for the sequence of belt displacement to be from the center of the receptacle toward each of the opposite ends thereof, or from each of the opposite ends toward the center. Still further, with regard to connecting ends of the belts to the receptacle wall and elevating the belts to achieve unloading, it will be appreciated that the ends of the belts can be provided with structures or components to enable such lifting to be achieved other than through the use of the components for connecting the belt end to the container wall. The foregoing and other modifications of the embodiment herein illustrated and described will be obvious or suggested to those skilled in the art, whereby it is to be distinctly understood that the foregoing descriptive matter is to be interpreted merely as illustrative of the present invention and not as a limitation.

Having thus described the invention, it is claimed:

1. A displaceable liner arrangement for unloading an open top receptacle having a bottom wall, a pair of spaced apart first walls extending upwardly from said bottom wall, and a pair of spaced apart second walls extending between said first walls and upwardly from said bottom wall, said walls having upper ends providing said open top, said liner arrangement comprising a plurality of adjacent belt members between said first walls and overlying said second walls and bottom wall, said belt members having opposite sides extending in the direction between said second walls and opposite ends adjacent the upper ends of said second walls, each of said belt members having a width less than the distance between said first walls, the sides of adjacent ones of said belt members being overlapped in the direction between said first walls, and one of the opposite ends of each of said belt members including means for connecting said one end to the upper end of the corresponding one of said second walls, whereby upward displacement of the other of said opposite ends of each of said belt members displaces said belt members upwardly relative to the upper end of said corresponding one of said second walls.

2. A liner arrangement according to claim 1, wherein said opposite sides of said belt members are corresponding first and second sides with respect to the direction between said first walls, said overlapped sides of adjacent ones of said belt members providing for the first side of each said belt member to overlie the second side of the adjacent belt member.

3. A liner arrangement according to claim 2, wherein the other of said opposite ends of each of said belt members includes means for connecting said other ends to the upper end of the corresponding other of said second walls.

4. A liner arrangement according to claim 1, wherein said sides of said adjacent belt members are overlapped a distance of about one-half said width.

5. A liner arrangement according to claim 1, wherein the other of said opposite ends of each of said belt members includes means for connecting said other ends to the upper end of the corresponding other of said second walls.

6. A liner arrangement according to claim 5, wherein said means for connecting said one and other of said opposite ends of each of said belt members to said second walls includes releaseable connecting means for selectively connecting said one and other ends of said belt members to said one and other second walls.

7. A liner arrangement according to claim 6, wherein said opposite sides of said belt members are corresponding first and second sides with respect to the direction between said first walls, said overlapped sides of adjacent ones of said belt members providing for the first side of each said belt member to overlie the second side of the adjacent belt member.

8. A liner arrangement according to claim 6, wherein said connecting means on said one and other ends of said belt members provide means to facilitate upward displacement of the corresponding belt end.

9. A liner arrangement according to claim 8, wherein said opposite sides of said belt members are corresponding first and second sides with respect to the direction between said first walls, said overlapped sides of adjacent ones of said belt members providing for the first side of each said belt member to overlie the second side of the adjacent belt member.

10. A liner arrangement according to claim 9, wherein said sides of said adjacent belt members are overlapped a distance of about one-half said width.

* * * * *